US007441355B2

(12) United States Patent
Wilcoxen

(10) Patent No.: US 7,441,355 B2
(45) Date of Patent: Oct. 28, 2008

(54) FOLDING TRADING CARD WITH MAGNIFYING REGION

(75) Inventor: Wayne Wilcoxen, Carlsbad, CA (US)

(73) Assignee: The Upper Deck Company, Cheyenne, NV (US)

( * ) Notice: Subject to any disclaimer, the term of this patent is extended or adjusted under 35 U.S.C. 154(b) by 274 days.

(21) Appl. No.: 11/376,953

(22) Filed: Mar. 16, 2006

(65) Prior Publication Data

US 2006/0225318 A1 Oct. 12, 2006

Related U.S. Application Data

(60) Provisional application No. 60/662,633, filed on Mar. 16, 2005.

(51) Int. Cl.
*G02B 27/04* (2006.01)

(52) U.S. Cl. ...................... 40/365; 40/124.08; 359/801; 359/803; 359/817; 359/474

(58) Field of Classification Search .................. 40/635, 40/124.08, 365; 359/817, 802, 801, 803, 359/474; 446/487, 488
See application file for complete search history.

(56) References Cited

U.S. PATENT DOCUMENTS

| | | | | |
|---|---|---|---|---|
| 1,957,716 | A | 5/1934 | Koster | |
| 2,692,530 | A * | 10/1954 | Gowland | 359/474 |
| 2,794,367 | A * | 6/1957 | Turner | 359/474 |
| 2,809,452 | A * | 10/1957 | Brown | 40/365 |
| 2,872,844 | A * | 2/1959 | Van Tuyl | 359/474 |
| 2,906,170 | A * | 9/1959 | Kiehl et al. | 359/474 |
| 2,986,830 | A * | 6/1961 | Waldenburg et al. | 359/474 |
| 3,000,123 | A | 9/1961 | Hicks | |
| 3,438,698 | A | 4/1969 | Triggs | |
| 3,553,866 | A | 1/1971 | Redford et al. | |
| 3,562,939 | A | 2/1971 | Jacobs et al. | |
| 3,582,182 | A * | 6/1971 | Martin | 359/474 |
| 3,756,699 | A | 9/1973 | Martin | |
| 4,365,432 | A | 12/1982 | McCauley et al. | |
| 4,435,912 | A * | 3/1984 | Adrian et al. | 40/365 |
| 4,660,931 | A * | 4/1987 | Chevalier | 359/474 |
| 4,881,334 | A | 11/1989 | Brown | |

(Continued)

*Primary Examiner*—Gary C Hoge
(74) *Attorney, Agent, or Firm*—Roeder & Broder LLP

(57) ABSTRACT

A trading card includes a front wall, a back wall, a bottom wall, and a top wall. The front wall retains a viewing lens. The back wall retains an image. The bottom wall extends between the front wall and the back wall. The top wall extends between the front wall and the back wall. Three of the walls are moveable relative to the other wall to move the trading card from a folded configuration to an unfolded configuration. In the folded configuration, the walls are substantially parallel to each other. Further, in the unfolded configuration, the front wall and the back wall are substantially parallel and spaced apart, and the bottom wall and the top wall are substantially parallel and spaced apart. Additionally, the image is viewable through the viewing lens when the trading card is in the unfolded configuration. Moreover, the image can be on a piece of film and the viewing lens can be a magnifying lens. With this design, the trading card can be sized and shaped like a regular trading card when the trading card is in the folded configuration and the trading card can be simply expanded from the folded configuration to the unfolded configuration in which the trading card functions as a magnifying viewing box.

20 Claims, 5 Drawing Sheets

U.S. PATENT DOCUMENTS 5,002,363 A * 3/1991 Tanaka .......................... 359/474
5,058,991 A * 10/1991 Curtin .......................... 359/474
5,570,275 A 10/1996 Luquire
5,572,371 A 11/1996 Woolf
5,881,483 A 3/1999 Lee et al.
6,614,604 B1 9/2003 Budde

* cited by examiner

FOLDING TRADING CARD WITH MAGNIFYING REGION

RELATED APPLICATION

This Application claims the benefit on U.S. Provisional Application Ser. No. 60/662,633 filed on Mar. 16, 2005. The contents of U.S. Provisional Application Ser. No. 60/662,633 are incorporated herein by reference.

BACKGROUND

Trading cards are a popular way to collect images and information about characters, athletes and celebrities. Trading cards can also be used in card games and other activities. Unfortunately, many of the trading cards are manufactured in large quantities and are not very unique.

SUMMARY

The present invention is directed to a trading card including a front wall, a back wall, a bottom wall, and a top wall. The front wall retains a viewing lens. The back wall retains an image. The bottom wall extends between the front wall and the back wall. The top wall extends between the front wall and the back wall. In one embodiment, three of the walls move relative to the other wall to move the trading card from a folded configuration to an unfolded configuration. In the folded configuration, the walls are substantially parallel to each other. In the unfolded configuration, the front wall and the back wall are substantially parallel and spaced apart, and the bottom wall and the top wall are substantially parallel and spaced apart. Additionally, the image is viewable through the viewing lens when the trading card is in the unfolded configuration. Moreover, in one embodiment, the image is on a piece of film and the viewing lens is a magnifying lens.

With this design, in certain embodiments, the trading card can be sized and shaped like a regular trading card when the trading card is in the folded configuration and the trading card can be simply expanded from the folded configuration to the unfolded configuration in which the trading card functions as a magnifying viewing box.

Additionally, the trading card can include a tab that is movable between an unlocked position and a locked position. In the unlocked position, the tab allows the trading card to move from the unfolded configuration to the folded configuration. Alternatively, in the locked position, the tab inhibits the trading card from moving from the unfolded configuration to the folded configuration. In one embodiment, the tab is a portion of the bottom wall that pivots relative to the rest of the bottom wall.

In certain embodiments, the walls can be made from three cards that are joined together. In this embodiment, each of the cards includes a distal end and a proximal end. Further, all of the cards are coupled to each other near the distal end and all of the cards are coupled to each other near the proximal end. With this design, the trading card can be made relatively easily and inexpensively.

The present invention is also directed to a method for viewing an image. The method includes the steps of (i) providing a trading card including a front wall that retains a viewing lens, a back wall that retains the image, a bottom wall that extends between the front wall and the back wall, and a top wall that extends between the front wall and the back wall; and (ii) moving three of the walls relative to the other wall to move the trading card from a folded configuration in which the walls are substantially parallel, to an unfolded configuration in which the front wall and the back wall are substantially parallel and the bottom wall and the top wall are substantially parallel.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1A:
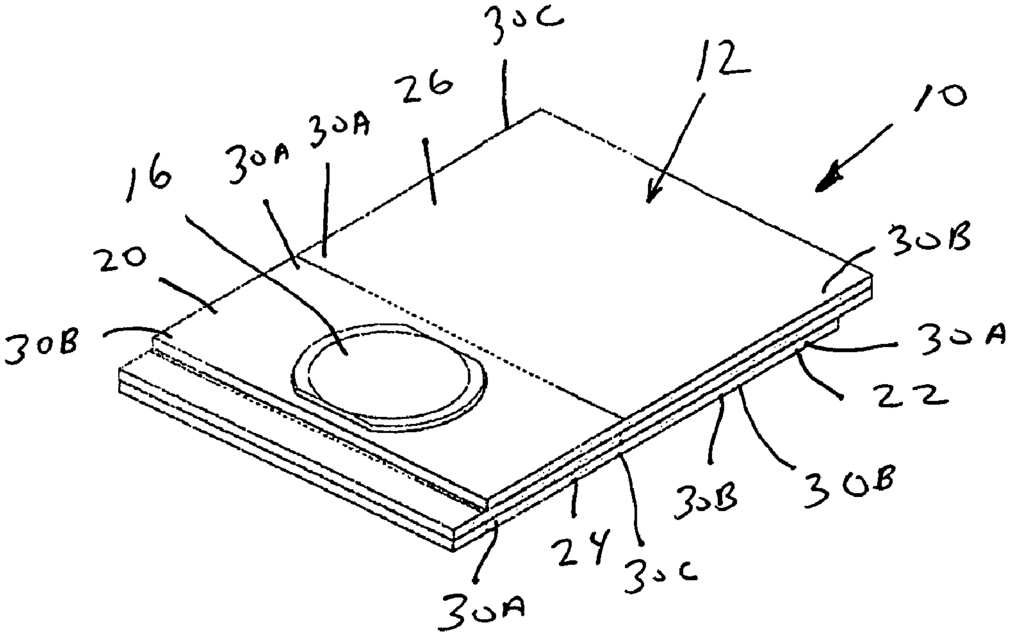
FIG. 1A is a top perspective view of a trading card having features of the present invention with the trading card in a folded configuration.
Figure 1B:
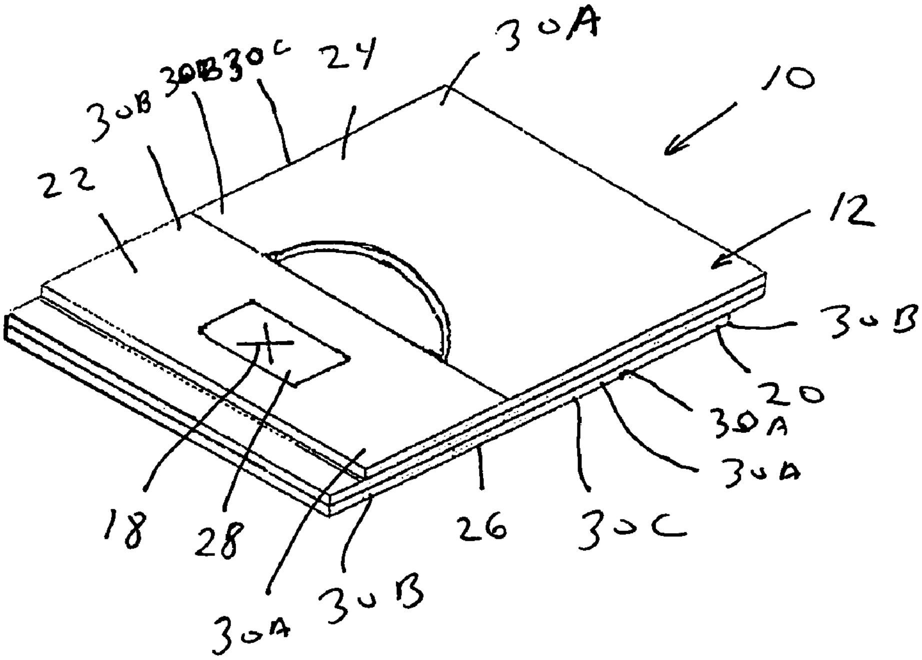
FIG. 1B is a bottom perspective view of the trading card of FIG. 1A with the trading card in the folded configuration.

FIG. 1A is a top perspective view and FIG. 1B is a bottom perspective view of a trading card 10 having features of the present invention with the trading card 10 in a folded configuration 12. As provided herein, the trading card 10 can easily be moved between the folded configuration 12 and an unfolded configuration 14 illustrated in FIGS. 2A-2C. The trading card 10, for example, can be a collectible item or can be used is sports or entertainment games.

In one embodiment, the trading card 10 includes a viewing lens 16, one or more images 18 (illustrated as an "X"), a front wall 20, a back wall 22, a bottom wall 24, and a top wall 26. In this embodiment, when the trading card 10 is in the unfolded configuration 14, a user (not shown) can view the image 18 through the viewing lens 16. Alternatively, when the trading card 10 is in the folded configuration 12, the user is not able to view the image 18 through the viewing lens 16. The size and shape of the components of the trading card 10 can be varied to suit the desired design requirements of the trading card 10.

The design of the viewing lens 16 can be varied pursuant to the teachings provided herein. For example, the lens 16 can be a piece of glass, plastic, or other transparent material. In one embodiment, the lens 16 is a magnifying glass that enlarges the image 18 on the piece of film 28.

The image 18 for example, can include one or more characters, sports athletes, celebrities, an entertainers, statistics, information, instructions, a game field or arena, an image used in a game, data, a character, an autograph, an animal and/or landscape. In one embodiment, the image 18 is positioned on a piece of rectangular film 28. The film 28 can be at least partly transparent. Alternatively, the image 18 can be positioned on another medium and/or the film 28 could have another shape.

Additionally, in one embodiment, the film 28 is fixedly secured to the trading card 10. Alternatively, for example, the film 28 could be selectively removable from the back wall 22. With this design, the film 28 could be interchangeable.

The front wall 20 retains the viewing lens 16. The back wall 22 retains the image 18. The bottom wall 24 and the top wall 26 each extend between and maintain the front wall 20 and the back wall 22 spaced apart when the trading card 10 is the unfolded configuration 14. In one embodiment, each wall 20, 22, 24, 26 is generally rectangular shaped and each wall 20, 22, 24, 26 includes a first connected edge 30A, a second connected edge 30B that is opposite the first connected edge 30A, and a pair of opposed unconnected edges 30C.

In one embodiment, (i) the first connected edge 30A of the front wall 20 is secured to the first connected edge 30A of the top wall 26; (ii) the second connected edge 30B of the front wall 20 is secured to the first connected edge 30A of the bottom wall 24; (iii) the first connected edge 30A of the back wall 22 is secured to the second connected edge 30B of the top wall 26; and (iv) the second connected edge 30B of the back wall 22 is secured to the second connected edge 30B of the bottom wall 24.

In one embodiment the trading card 10 can be slightly weakened (e.g. embossed, scored, or crimped) at the connections between the walls 20, 22, 24, 26 to facilitate relative movement of the walls 20, 22, 24, 26 so that the trading card 10 can be easily moved between the configurations 12, 14. In one embodiment, the trading card 10 is perforated, e.g. including a line of holes, at the connections between the walls 20, 22, 24, 26 to facilitate relative movement of the walls 20, 22, 24, 26.

Additionally, as illustrated in FIGS. 1A and 1B, in the folded configuration 12, (i) the walls 20, 22, 24, 26 are all substantially parallel to each other, and (ii) the viewing lens 16 and the film 28 are substantially parallel to each other. Further, in the folded configuration 12, (i) the front wall 20 and the top wall 26 are substantially coplanar, and (ii) the bottom wall 24 and the back wall 22 are substantially coplanar.

In one embodiment, in the folded configuration 12, the trading card 10 is generally flat, rectangular shaped and has a length of between 2 and 6 inches, a width of between approximately 1.5 and 4.0 inches, and a thickness of between approximately 0.0625 and 0.25 inches. For example, in the folded configuration 12, the trading card 10 can be similarly sized and shaped as a standard trading card having a length of approximately 3.5 inches, a width of approximately 2.5 inches, and a thickness of between approximately 0.06 and 0.2 inches.

Figure 2A:
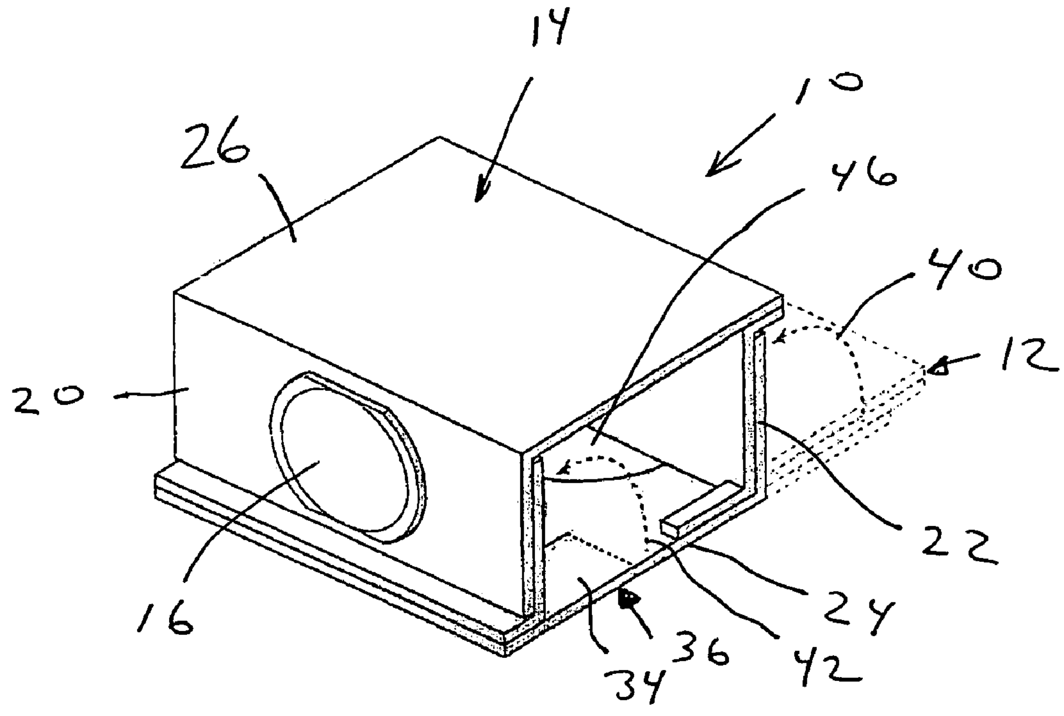
FIG. 2A is a top perspective view of the trading card of FIG. 1A in an unfolded configuration with a tab in an unlocked position.
Figure 2B:
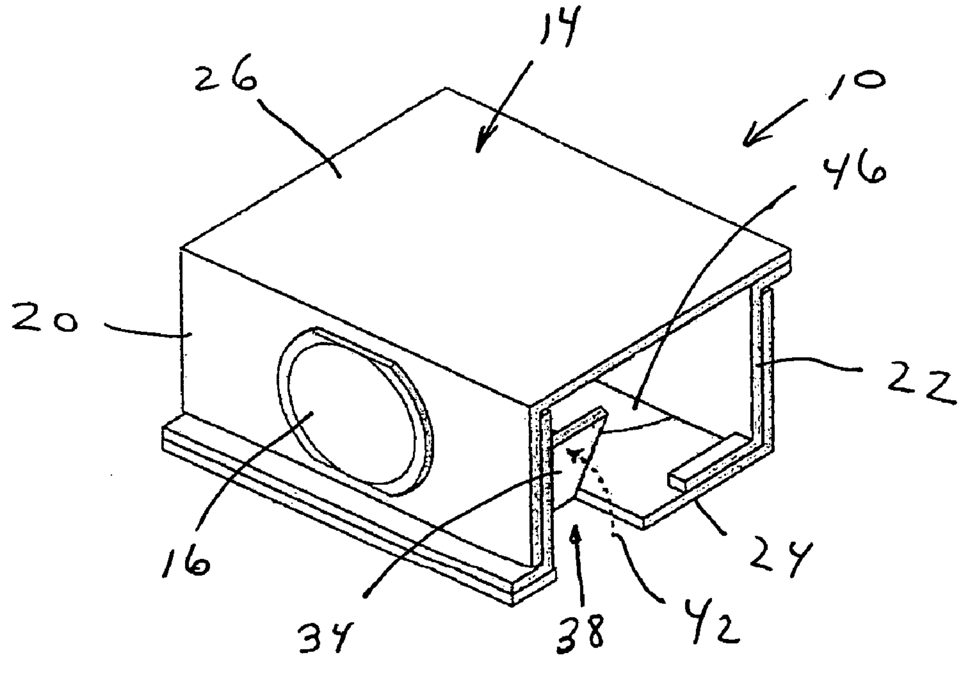
FIG. 2B is a top perspective view of the trading card of FIG. 1A in the unfolded configuration with the tab in a locked position.
Figure 2C:
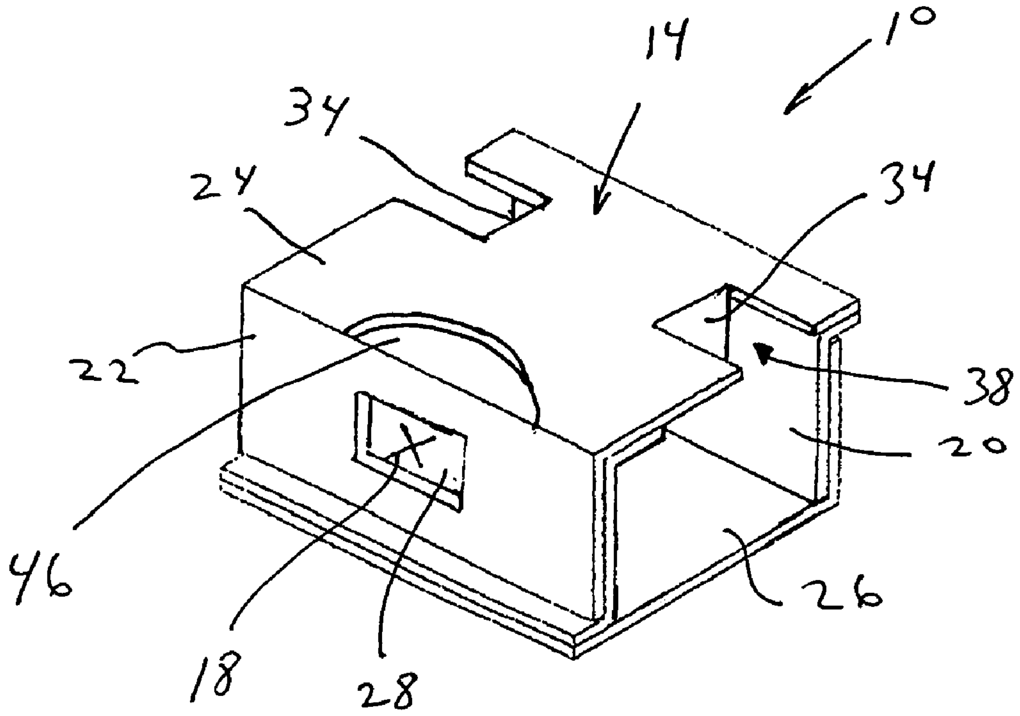
FIG. 2C is a bottom perspective view of the trading card of FIG. 1A in the unfolded configuration with two tabs in a locked position.

FIG. 2A is a top, front perspective view of the trading card 10 in an unfolded configuration 14 with a pair of tabs 34 (only one is illustrated in FIG. 2A) in an unlocked position 36, FIG. 2B is a top, front perspective view of the trading card 10 in the unfolded configuration 14 with the tabs 34 (only one is illustrated in FIG. 2A) in a locked position 38, and FIG. 2C is a bottom, rear perspective view of the trading card 10 in the unfolded configuration 14 with the tabs 34 in the locked position 38. In the unfolded configuration 14, the user can easily view the image 18 through the viewing lens 16.

FIGS. 2A-2C illustrate that in the unfolded configuration 14, the trading card 10 (i) is now generally rectangular tube shaped having open sides; (ii) the front wall 20 and the back wall 22 are substantially parallel and spaced apart; (iii) the bottom wall 24 and the top wall 26 are substantially parallel and spaced apart; (iv) the film 28 and the viewing lens 16 are substantially parallel, spaced apart, and are aligned so that the film 28 can be viewed through the viewing lens 16; (v) the bottom wall 24 extends between the front wall 20 and the back wall 22; and (vi) the top wall 26 extends between the front wall 20 and the back wall 22.

FIG. 2A also illustrates a portion of the trading card 10 in the folded configuration 12 (illustrated in phantom). In FIG. 2A, arrow 40 illustrates movement of the trading card 10 from the folded configuration 12 to the unfolded configuration 14. More specifically, three of the walls move relative to the other wall during movement between configurations 12, 14. For example, during movement from the folded configuration 12 to the unfolded configuration 14, (i) the front wall 20 has pivoted relative to the bottom wall 24 from being substantially parallel to the bottom wall 24 in the folded configuration 12 to being substantially perpendicular to the bottom wall 24 in the unfolded configuration 14 (approximately 90 degrees rotation); (ii) the back wall 22 has pivoted relative to the bottom wall 24 from being substantially parallel to and in substantially the same plane as the bottom wall 24 in the folded configuration 12 to being substantially perpendicular to the bottom wall 24 in the unfolded configuration 14 (approximately 90 degrees rotation); (iii) the front wall 20 has pivoted relative to the top wall 24 from being substantially parallel to and in substantially the same plane as the top wall 26 in the folded configuration 12 to being substantially perpendicular to the top wall 26 in the unfolded configuration 14 (approximately 90 degrees rotation); (iv) the back wall 22 has pivoted relative to the top wall 26 from being substantially parallel to the top wall 26 in the folded configuration 12 to being substantially perpendicular to the top wall 26 in the unfolded configuration 14 (approximately 90 degrees rotation); and (v) the top wall 26 has moved relative to the bottom wall 24 from being substantially parallel and adjacent to the bottom wall 24 in the folded configuration 12 to being substantially parallel and spaced apart from the bottom wall 24 in the unfolded configuration 14.

It should be noted that movement from the unfolded configuration 14 to the folded configuration 12 results in the opposite motion described above.

As mentioned previously, the trading card 10 includes one or more tabs 34 that are moved between the unlocked position 36 (illustrated in FIG. 2A) and the locked position 38 (illustrated in FIGS. 2B and 2C). Arrow 42 in FIGS. 2A and 2B illustrate movement of one tab 34 from the unlocked position 36 to the locked position 38. With the tabs 34 in the unlocked position 36, the trading card 10 is free to move between configurations 12, 14. However, when the tabs 34 are in the locked position 38, the tabs 34 inhibit movement of the trading card 10 from the unfolded configuration 14 back to the folded configuration 12. Stated in another fashion, the tabs 34 in the locked position 38 hold and maintain the trading card in the unfolded configuration 14.

The design, number, and location of the tabs 34 can vary. In the embodiment illustrated in FIGS. 2A-2C, the tabs 34 are a portion of the bottom wall 24 that has been partly cut from the bottom wall 24 and rotated. In the unlocked position 36, the tab 34 is generally parallel and coplanar with the rest of the bottom wall 24. In this position, the trading card 10 is free to move between configurations 12, 14. In the locked position 38, each tab 34 (i) has been rotated 90 degrees relative to the rest of the bottom wall 24, (ii) is adjacent to the front wall 20, and (iii) extends generally perpendicular to the front wall 20 and the rest of the bottom wall 24. With this design, an edge of the tab 34 engages the inside of the front wall 20 to inhibit movement of the trading card 10 from the unfolded configuration 14 to the folded configuration 12 and to stabilize the trading card 10 in the unfolded configuration 14.

Additionally, in certain embodiments, the notches in the bottom wall 24 and the tabs 34 provide a convenient position to hold the trading card 10 in the unfolded configuration 14. It should be noted that the notches and tabs 34 can be wider so that larger fingers can fit in the notches and tabs 34.

It should be noted that in one embodiment, opposite walls are generally the same size and configuration. For example, the front wall 20 and the back wall 22 have substantially the same size and configuration. Further, the top wall 26 and the bottom wall 24 have substantially the same size and configuration.

Additionally, in one embodiment, the bottom wall 24 includes an arch shaped wall opening 46 located near the back wall 22. In certain embodiments, in the folded configuration 12, before the trading card 10 has ever been moved to the unfolded configuration 14, the scored or weakened areas can be relatively stiff. The wall opening 46 can provide a finger hole, e.g. a place to push, to start to move the trading card 10 from the folded configuration 12 to the unfolded configuration 14 for the first time. After the trading card 10 has been moved between the configurations 12, 14 a number of times, the wall opening 46 may not be necessary.

Figure 3A:
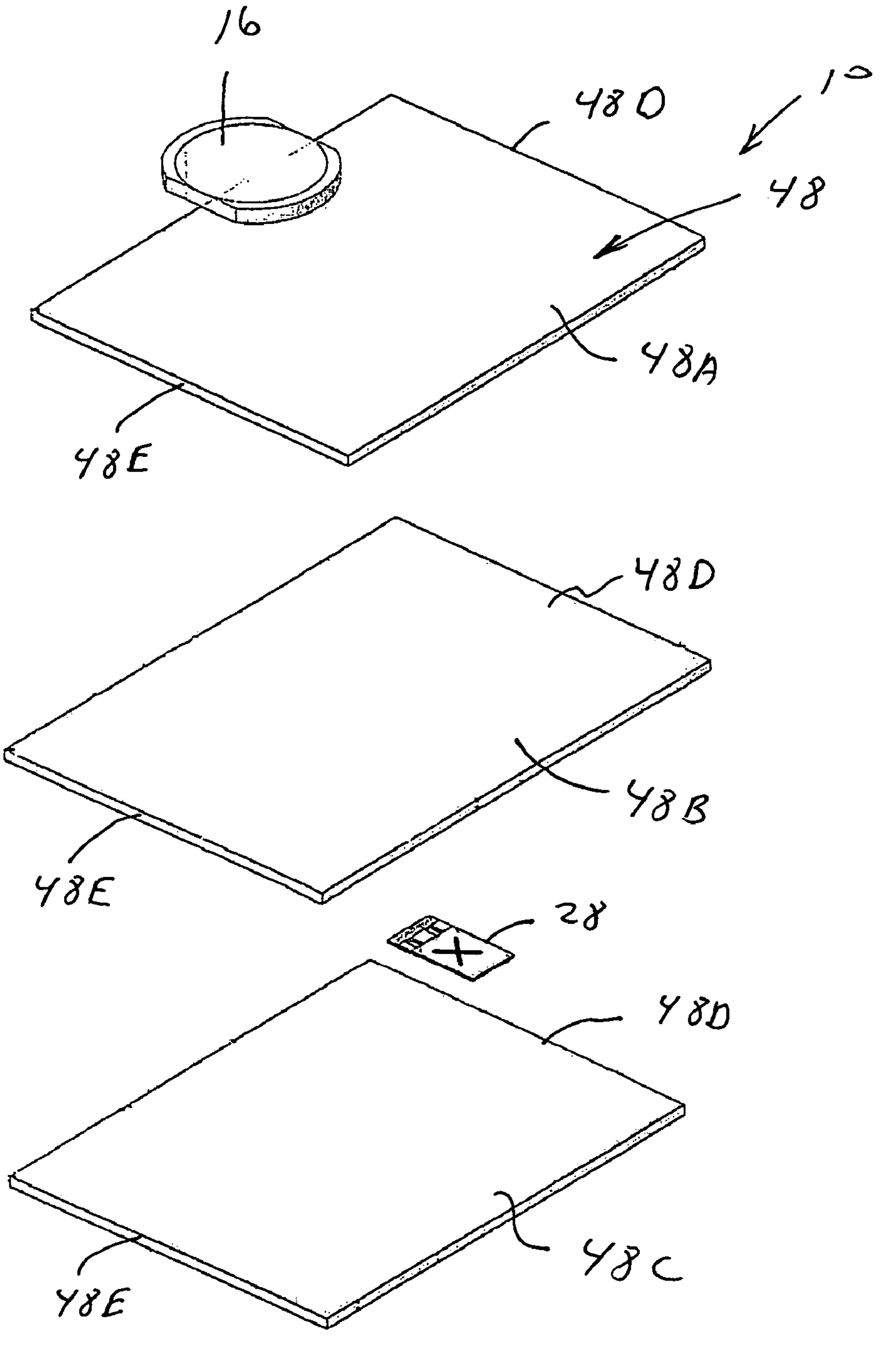
FIG. 3A is an exploded view of the beginning components of the trading card.
Figure 3B:
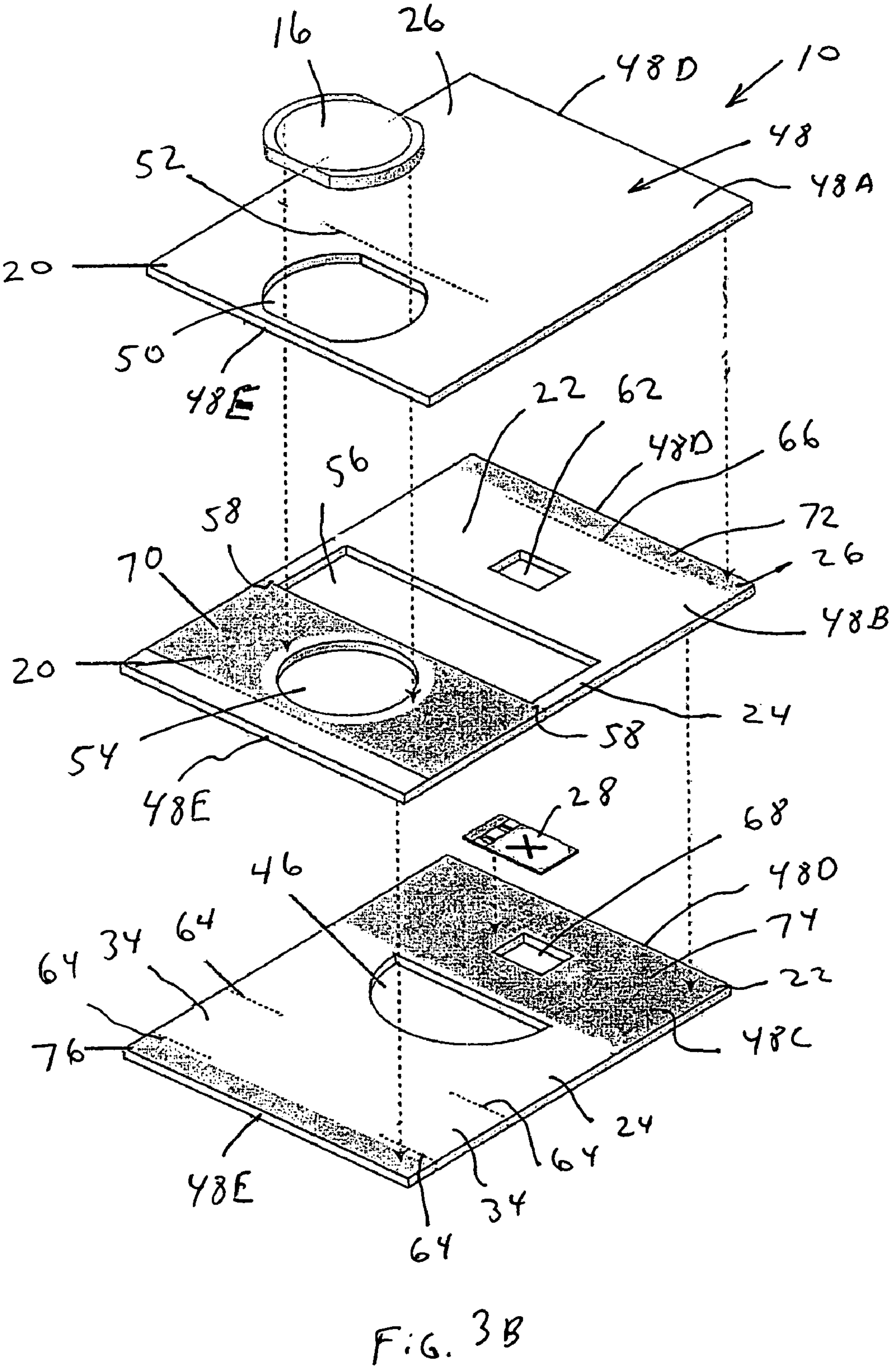
FIG. 3B is an exploded perspective view of one embodiment of the trading card.

FIG. 3A is an exploded view of the beginning components, and FIG. 3B is an exploded perspective view of one non-exclusive, embodiment of the trading card 10.

FIG. 3A illustrates that in this embodiment, the trading card 10 can be made out of the viewing lens 16, the piece of film 28, and multiple cards 48. In FIG. 3A, the trading card 10 includes a first card 48A, a second card 48B, and a third card 48C. In one embodiment, each of the cards 48A, 48B, 48C is generally rectangular shaped and the same size. For example, each of the cards 48A, 48B, 48C can be a piece of card stock. In one embodiment, each of the cards 48A, 48B, 48C is made of 24 points card stock.

In FIGS. 3A and 3B, each of the card stocks 48A-48C includes a distal end 48D and a proximal end 48E.

FIG. 3B illustrates that the card 48A-48C have been die-cut and scored prior to assembly. More specifically, FIG. 3B illustrates that (i) a lens aperture 50 has been die cut from the first card 48A; (ii) a first cut 52 (illustrated as dashed line) was made in the first card 48A across a portion of the first card 48A to provided a weakened area for the front wall 20 to bend relative to the top wall 26; (iii) a lens aperture 54 has been die cut from the second card 48B; (iv) a rectangular shaped intermediate aperture 56 has been die cut from the second card 48B; (v) a pair of cuts 58 have been made at the proximal edge of the intermediate aperture 56; (vi) a rectangular shaped film aperture 62 has been die cut from the second card 48B; (vii) each of the tabs 34 is made with a pair of spaced apart, cuts 64 made in the third card 48C; (viii) a second cut 66 (illustrated as dashed line) was made in the second card 48B across a portion of the second card 48B to provided a weakened area for the rear wall 22 to bend relative to the bottom wall 26; (ix) the semicircular wall opening 46 has been die cut from the third card 48C; and (x) a rectangular shaped film aperture 68 has been die cut from the third card 48C.

As mentioned above the three card 48A-48C are assembled together to form the trading card 10. Referring to FIG. 3B, (i) the viewing lens 16 is secured to the second card 48B over the lens aperture 54, (ii) the lens aperture 50 of the first card 48A is positioned around the viewing lens 16, and (iii) the proximal end 48E of the first card 48A is secured with an adhesive 70 to second card 48B at a location that is slightly spaced apart from the proximal end 48E of the second card 48B. With this design, a portion of the first card 48A and a portion of the second card 48B cooperate to form the front wall 20. Additionally, the first card 48A defines the top wall 26.

Further, (i) the distal end 48D of the first card 48A is secured with an adhesive 72 to the distal end 48D of the second card 48B, (ii) the distal end 48D of the third card 48C is secured with an adhesive 74 to second card 48B at a location that is slightly spaced apart from the distal end 48D of the second card 48B with the piece of film 28 positioned therebetween aligned with the film apertures 62, 68, and (iii) the second card 48B is separated at the cuts 58. With this design, a portion of the second card 48B and a portion of the third card 48B cooperate to form the rear wall 22. Further, the third card 48C defines the bottom wall 24.

Finally, the proximal end 48E of the second card 48B is secured with an adhesive 76 to the proximal end 48E of the third card 48B.

It should be noted that the adhesives 70, 72, 74, 76 can be replaced with another type of fastener.

It is to be understood that the trading cards 10 disclosed herein is merely illustrative of the presently preferred embodiments of the invention and that no limitations are intended to the details of construction or design herein shown other than as described in the appended claims.

What is claimed is:

1. A trading card comprising:

a front wall that retains a viewing lens;

a back wall that retains an image;

a bottom wall that extends between the front wall and the back wall; and a top wall that extends between the front wall and the back wall;

wherein three of the walls move relative to the other wall to move from a folded configuration in which the walls are substantially parallel to an unfolded configuration in which the front wall and the back wall are substantially parallel, and the bottom wall and the top wall are substantially parallel; wherein the walls are made from three cards, wherein each of the cards includes a distal end and a proximal end, and wherein all of the cards are coupled to each other near the distal end and all of the cards are coupled to each other near the proximal end.

2. The trading card of claim 1 wherein the image is viewable through the viewing lens in the unfolded configuration.

3. The trading card of claim 1 wherein the walls form a rectangular tube in the unfolded configuration.

4. The trading card of claim 1 further comprising a tab that is movable between (i) a locked position in which the tab inhibits the walls from moving from the unfolded configuration to the folded configuration, and (ii) an unlocked position in which the tab allows the walls to move from the unfolded configuration to the folded configuration.

5. The trading card of claim 4 wherein the tab is a portion of the bottom wall that pivots relative to the rest of the bottom wall.

6. The trading card of claim 1 wherein the image is on a piece of film and the viewing lens is a magnifying lens.

7. The trading card of claim 6 wherein the film and the viewing lens are substantially parallel when the walls are in the unfolded configuration.

8. A trading card comprising:

a front wall that retains a viewing lens;

a back wall that retains an image;

a bottom wall that extends between the front wall and the back wall; and a top wall that extends between the front wall and the back wall;

wherein at least three of the walls move relative to the other wall to move from a folded configuration to an unfolded configuration, and wherein at least one of the walls includes a tab that is movable between (i) an unlocked position in which the walls are free to move from the unfolded configuration to the folded configuration, and (ii) a locked position in which the tab inhibits the walls from moving from the unfolded configuration to the folded configuration;

wherein the walls are made from three cards, wherein each of the cards includes a distal end and a proximal end, and wherein all of the cards are coupled to each other near the distal end and all of the cards are coupled to each other near the proximal end.

9. The trading card of claim 8 wherein the image is viewable through the viewing lens in the unfolded configuration.

10. The trading card of claim 8 wherein the walls form a rectangular tube in the unfolded configuration.

11. The trading card of claim 8 wherein the tab is a portion of the bottom wall that pivots relative to the rest of the bottom wall.

12. The trading card of claim 8 wherein the image is on a piece of film and the viewing lens is a magnifying lens.

13. The trading card of claim 12 wherein the film and the viewing lens are substantially parallel when the walls are in the unfolded configuration.

14. A method for viewing an image, the method comprising the steps of:

providing a trading card including a front wall that retains a viewing lens, a back wall that retains the image, a bottom wall that extends between the front wall and the back wall, and a top wall that extends between the front wall and the back wall; wherein the trading card includes three cards, each of the cards includes a distal end and a proximal end, and all of the cards are coupled to each other near the distal end; and moving three of the walls relative to the other wall to move the trading card from a folded configuration in which the walls are substantially parallel, to an unfolded configuration in which the front wall and the back wall are substantially parallel, and the bottom wall and the top wall are substantially parallel.

15. The method of claim 14 further comprising the step of viewing the image through the viewing lens.

16. The method of claim 14 further comprising the step of moving a tab from (i) an unlocked position in which the tab allows the walls to move from the unfolded configuration to the folded configuration, and (ii) a locked position in which the tab inhibits the walls from moving from the unfolded configuration to the folded configuration.

17. The method of claim 14 wherein the step of providing a trading card includes the step of coupling all of the cards to each other near the proximal end.

18. A trading card comprising:

a front wall that retains a viewing lens;

a back wall that retains an image;

a bottom wall that extends between the front wall and the back wall; and a top wall that extends between the front wall and the back wall;

wherein three of the walls move relative to the other wall to move from a folded configuration in which the walls are substantially parallel to an unfolded configuration in which the front wall and the back wall are substantially parallel, and the bottom wall and the top wall are substantially parallel; wherein the walls are made from a plurality of cards, wherein each of the cards includes a distal end and a proximal end, and wherein the cards are coupled to each other near at least one of the ends.

19. The trading card of claim 18 wherein the cards are coupled to each other near the distal end and the cards are coupled to each other near the proximal end.

20. The trading card of claim 18 wherein the walls form a rectangular tube in the unfolded configuration.

* * * * *